US011904497B2

(12) United States Patent
Frolov

(10) Patent No.: US 11,904,497 B2
(45) Date of Patent: Feb. 20, 2024

(54) EXTRUDER OF AGRICULTURAL FIBROUS MATTER FOR PRODUCING BOARDS WITH IMPROVED HOMOGENITY

(71) Applicant: FIBIOTEX S.A., Windhof (LU)

(72) Inventor: Aleksandr Frolov, Windhof (LU)

(73) Assignee: FIBIOTEX S.A., Windhof (LU)

( * ) Notice: Subject to any disclaimer, the term of this patent is extended or adjusted under 35 U.S.C. 154(b) by 0 days.

(21) Appl. No.: 17/461,048

(22) Filed: Aug. 30, 2021

(65) Prior Publication Data

US 2022/0396002 A1 Dec. 15, 2022

(30) Foreign Application Priority Data

Jun. 9, 2021 (LU) .................................. LU500263

(51) Int. Cl.

| | |
|---|---|
| ***B27N 3/04*** | (2006.01) |
| ***B27N 3/02*** | (2006.01) |
| ***B27N 3/06*** | (2006.01) |
| ***B27N 3/18*** | (2006.01) |
| ***B27N 3/28*** | (2006.01) |
| ***B30B 11/26*** | (2006.01) |
| ***B30B 15/08*** | (2006.01) |
| ***B30B 15/30*** | (2006.01) |

(52) U.S. Cl.

CPC ................ *B27N 3/04* (2013.01); *B27N 3/02* (2013.01); *B27N 3/06* (2013.01); *B27N 3/183* (2013.01); *B27N 3/28* (2013.01); *B30B 11/265* (2013.01); *B30B 15/08* (2013.01); *B30B 15/308* (2013.01)

(58) Field of Classification Search

CPC ... B27N 3/02; B27N 3/04; B27N 3/06; B27N 3/183; B27N 3/18; B27N 3/28; B30B 11/26; B30B 11/265; B30B 15/08; B30B 15/308; B30B 9/30; B30B 9/301; B30B 7/34; B30B 9/3078; A01F 25/00; A23K 30/10; A23N 17/005; B65B 27/12

See application file for complete search history.

(56) References Cited

U.S. PATENT DOCUMENTS

| | | | | |
|---|---|---|---|---|
| 2,592,470 | A | 4/1952 | Ryberg | |
| 5,730,830 | A | 3/1998 | Hall | |
| 5,945,132 | A | 8/1999 | Sullivan et al. | |
| 6,546,986 | B1 * | 4/2003 | Waggoner ................ | B27N 1/00 156/581 |
| 2020/0290233 | A1 | 9/2020 | Laster et al. | |

FOREIGN PATENT DOCUMENTS

| | | | | |
|---|---|---|---|---|
| FR | 2448866 | A1 * | 9/1980 | ............. A01F 25/00 |
| FR | 2687635 | A1 * | 8/1993 | ........... A23N 17/005 |

OTHER PUBLICATIONS

FR2687635-Machine Translation (Year: 1993).*
FR2448866A1-Machine Translation (Year: 1980).*

* cited by examiner

*Primary Examiner* — Yunju Kim
(74) *Attorney, Agent, or Firm* — Sandberg Phoenix & von Gontard PC

(57) ABSTRACT

The invention is directed to a machine for compacting agricultural fibrous matter into a board, comprising a hopper for receiving the agricultural fibrous matter; an extruder comprising an extrusion passage downstream of the hopper; and a ram configured for moving in a reciprocal manner along the extrusion passage; wherein the extrusion passage further comprises a movable wall configured for moving between a feed position, opening the extrusion passage to the hopper, and an extrusion position, closing the extrusion passage.

16 Claims, 4 Drawing Sheets

EXTRUDER OF AGRICULTURAL FIBROUS MATTER FOR PRODUCING BOARDS WITH IMPROVED HOMOGENITY

CROSS-REFERENCE TO RELATED APPLICATION

This application claims the benefit, under 35 U.S.C. § 119, of LU500263 filed In Luxembourg on Jun. 9, 2021 the disclosure of which is incorporated herein by reference in its entirety

FIELD

The invention is directed to the field of manufacturing by extrusion of construction boards, more particularly to the field of extrusion of agricultural fibrous matter for producing fiberboards.

BACKGROUND

Prior art patent document published U.S. Pat. No. 2,592,470 discloses a machine for manufacturing fiberboards, comprising a hopper for receiving the fibers, a pre-comparting device with fingers carried by arms moved by a rotating drive, and an extruder with an extrusion passage fed by the hopper and a ram moving in a reciprocal manner in the extruding passage. The extruding passage comprises a cutting blade on an edge directly downstream of the opening of the extruding passage through which it is fed in fibers from the hopper. The level of compaction of the fibers when entering the extrusion passage is limited and can show inhomogeneities. The high level of compression achieved by the reciprocating ram compensates the low level of pre-compaction before extrusion but cannot properly correct the inhomogeneity in the transversal direction.

Prior art patent document published U.S. 5,730,830 discloses a machine for manufacturing fiberboards, comprising a hopper for receiving the fibers, a pre-compacting device with a battery of four helical screw conveyors, and an extruder with an extrusion passage fed by the hopper and a ram moving in a reciprocal manner in the extruding passage. The extrusion passage comprises a movable part forming a shear release mechanism configured such that in case of the presence of a hard debris such as a stone between the ram and the shear edge, the latter will be moved backwards and swing away, according to a trajectory defined by two links, from obstruction. Similarly to the preceding reference, the level of compaction of the fibers when entering the extrusion passage is limited and can show inhomogeneities. The high level of compression achieved by the reciprocating ram compensates the low level of pre-compaction before extrusion but cannot properly correct the inhomogeneity in the transversal direction. The high level of compression achieved by the reciprocating ram cannot properly correct the inhomogeneity in the transversal direction.

Prior art patent document published US 2020/0290233 A1 discloses a machine for manufacturing fiberboards, comprising a hopper for receiving the fibers, a pre-comparting device with three vertically oriented sprocket chains carrying fingers that move successively into, along and out of slits formed in an upper portion of a side wall of the hopper, a packing device with two parallel circular plates carrying transverse rods carrying fingers that move successively into, along and out of slits formed in a lower portion of a side wall of the hopper, and an extruder with an extrusion passage fed by the hopper and a ram moving in a reciprocal manner in the extruding passage. The two-step compaction achieved by the pre-compacting device and the packing device is interesting. Similarly to the preceding reference, the level of compaction of the fibers when entering the extrusion passage can show inhomogeneities.

Prior art patent document published U.S. Pat. No. 5,945,132 discloses a machine for manufacturing fiberboards similar to the preceding reference, i.e., comprising a hopper for receiving the fibers, a pre-compacting device with sprocket chains carrying fingers, a packing device with two parallel circular plates carrying transverse rods carrying fingers, and an extruder with an extrusion passage fed by the hopper and a ram moving in a reciprocal manner in the extruding passage. Similarly to the preceding reference, the level of compaction of the fibers when entering the extrusion passage can show inhomogeneities.

SUMMARY

The invention has for technical problem to overcome at least one drawback of the above-mentioned prior art. More specifically, the invention has for technical problem to provide a machine for compacting agricultural fibrous matter into a board, that provides a higher homogeneity of the fibrous matter in the board, particularly in a transversal direction of the board.

The invention is directed to a machine for compacting agricultural fibrous matter into a board. In various embodiments the machine comprises a hopper for receiving the agricultural fibrous matter; an extruder comprising an extrusion passage downstream of the hopper; and a ram configured for moving in a reciprocal manner along the extrusion passage; wherein the extrusion passage further comprises a movable wall configured for moving between a feed position opening the extrusion passage to the hopper, and an extrusion position closing the extrusion passage.

According to various embodiments, the movable wall comprises an upstream edge provided with a cutting blade configured for cooperating with a corresponding front edge of the ram in the extrusion position of the movable wall.

According to various embodiments, the corresponding front edge of the ram is provided with a cutting blade configured for cooperating with the cutting blade of the movable wall so as to cut the agricultural fibrous matter adjacent the upstream edge of the movable wall.

According to various embodiments, the front edge of the ram has an arrow-shaped longitudinal profile and the upstream edge of the movable wall has a straight longitudinal profile.

According to various embodiments, the movable wall is pivotally mounted on the extruder, at a downstream end of the movable wall.

According to various embodiments, the movable wall in the feed position connects with a wall of the hopper.

According to various embodiments, the machine further comprises: a pre-compacting device comprising several rows of fingers configured for moving successively into, along and out of vertical slits formed in at least a wall of the hopper, each row being independent in speed.

According to various embodiments, the pre-compacting device comprises a support rotating disk for each row of fingers and carrying the fingers of the corresponding row of fingers.

According to various embodiments, the pre-compacting device further comprises, for each row of fingers, a circular track eccentric with the support rotating disk, each finger being rotatably mounted on the corresponding support disk and with a crank engaging in the corresponding track so the finger remains parallel to a direction while the support rotating disk is rotating.

According to various embodiments, the pre-compacting device comprises at least three, for example at least four, rows of fingers of the several rows of fingers.

According to various embodiments, the machine further comprises a packing device comprising at least one row of rotating corrugated disks inserted through vertical slits formed in a wall of the hopper.

According to various embodiments, the at least one row of rotating corrugated disks comprises at least one of the row of rotating corrugated disks on each of two opposed main sides of the hopper.

According to various embodiments, each of the at least one row of rotating corrugated disks comprises at least 10 of the rotating corrugated disks.

According to various embodiments, each of the at least one row of rotating corrugated disks comprises a shaft rotatably supporting the rotating corrugated disks of the row.

According to various embodiments, the hopper has a rectangular cross-section profile with a width that progressively reduces along the packing device towards to the extruder.

According to various embodiments, the hopper has a bent longitudinal profile between the packing device and the extruder.

According to various embodiments, the pre-compacting is upstream of the packing device.

According to various embodiments, the present disclosure provides a machine for compacting agricultural fibrous matter into a board, comprising a hopper for receiving the agricultural fibrous matter; a pre-compacting device comprising several rows of fingers configured for moving successively into, along and out of vertical slits formed in at least a wall of the hopper; an extruder comprising an extrusion passage downstream of the hopper; and a ram configured for moving in a reciprocal manner along the extrusion passage; wherein each row of fingers of the pre-compacting device is independent in speed.

In various embodiments, the pre-compacting device comprises a support rotating disk for each row of fingers and carrying the fingers of the corresponding row of fingers.

In various embodiments, the pre-compacting device further comprises, for each row of fingers, a circular track eccentric with the support rotating disk, each finger being rotatably mounted on the corresponding support disk and with a crank engaging in the corresponding track so the finger remains parallel to a direction while the support rotating disk is rotating.

In various embodiments, the pre-compacting device comprises at least three, for example at least four, rows of fingers of the several rows of fingers.

In various embodiments, the machine further comprises a packing device comprising at least one row of rotating corrugated disks inserted through vertical slits formed in a wall of the hopper.

In various embodiments, the at least one row of rotating corrugated disks comprises at least one of the row of rotating corrugated disks on each of two opposed main sides of the hopper.

In various embodiments, each of the at least one row of rotating corrugated disks comprises at least ten of the rotating corrugated disks.

In various embodiments, each of the at least one row of rotating corrugated disks comprises a shaft rotatably supporting the rotating corrugated disks of the row.

In various embodiments, the hopper has a rectangular cross-section profile with a width that progressively reduces along the packing device towards to the extruder.

In various embodiments, has a bent longitudinal profile between the packing device and the extruder.

In various embodiments, the pre-compacting is upstream of the packing device.

The machine according to any one of, wherein the extrusion passage further comprises a movable wall configured for moving between a feed position opening the extrusion passage to the hopper, and an extrusion position closing the extrusion passage.

In various embodiments, the movable wall comprises an upstream edge provided with a cutting blade configured for cooperating with a corresponding front edge of the ram in the extrusion position of the movable wall.

In various embodiments, the corresponding front edge of the ram is provided with a cutting blade configured for cooperating with the cutting blade of the movable wall so as to cut the agricultural fibrous matter adjacent the upstream edge of the movable wall.

In various embodiments, the front edge of the ram has an arrow-shaped longitudinal profile and the upstream edge of the movable wall has a straight longitudinal profile.

In various embodiments, the movable wall is pivotally mounted on the extruder, at a downstream end of the movable wall.

In various embodiments, the movable wall in the feed position connects with a wall of the hopper.

According to various embodiments the present disclosure provides a machine for compacting agricultural fibrous matter into a board, comprising a hopper for receiving the agricultural fibrous matter; an extruder comprising an extrusion passage downstream of the hopper; and a ram configured for moving in a reciprocal manner along the extrusion passage; wherein the machine further comprises a packing device comprising at least one row of rotating corrugated disks inserted through vertical slits formed in a wall of the hopper.

In various embodiments, the at least one row of rotating corrugated disks comprises at least one of the row of rotating corrugated disks on each of two opposed main sides of the hopper.

In various embodiments, each of the at least one row of rotating corrugated disks comprises at least 10 of the rotating corrugated disks.

In various embodiments, each of the at least one row of rotating corrugated disks comprises a shaft rotatably supporting the rotating corrugated disks of the row.

In various embodiments, the hopper has a rectangular cross-section profile with a width that progressively reduces along the packing device towards to the extruder.

In various embodiments, the hopper has a bent longitudinal profile between the packing device and the extruder.

In various embodiments, the machine further comprises: a pre-compacting device comprising several rows of fingers configured for moving successively into, along and out of vertical slits formed in at least a wall of the hopper, each row being independent in speed.

In various embodiments, the pre-compacting device comprises a support rotating disk for each row of fingers and carrying the fingers of the corresponding row of fingers.

In various embodiments, the pre-compacting device further comprises, for each row of fingers, a circular track eccentric with the support rotating disk, each finger being rotatably mounted on the corresponding support disk and with a crank engaging in the corresponding track so the finger remains parallel to a direction while the support rotating disk is rotating.

In various embodiments, the pre-compacting device comprises at least three, for example at least four, rows of fingers of the several rows of fingers.

In various embodiments, the extrusion passage further comprises a movable wall configured for moving between a feed position opening the extrusion passage to the hopper, and an extrusion position closing the extrusion passage.

In various embodiments, the movable wall comprises an upstream edge provided with a cutting blade configured for cooperating with a corresponding front edge of the ram in the extrusion position of the movable wall.

In various embodiments, the corresponding front edge of the ram is provided with a cutting blade configured for cooperating with the cutting blade of the movable wall so as to cut the agricultural fibrous matter adjacent the upstream edge of the movable wall.

In various embodiments, the front edge of the ram has an arrow-shaped longitudinal profile and the upstream edge of the movable wall has a straight longitudinal profile.

In various embodiments, the movable wall is pivotally mounted on the extruder, at a downstream end of the movable wall.

In various embodiments, the movable wall in the feed position connects with a wall of the hopper.

The present disclosure is particularly interesting in that it comprises various measures that all participate in increasing homogeneity of the fibers. The inventors have observed that the earlier compression of the agricultural fibrous matter by the ram in the extrusion passage with the movable wall in the extrusion position is beneficial for the compression level and homogeneity of the compressed fibers. In particular, the cutting blades on the movable wall and the ram allow a proper shear of the residual fibers adjacent the cutting blades and thereby avoid disturbances of the compression process that would otherwise be caused by these residual fibers.

It is envisioned that inhomogeneities can be best handled upstream where the fibers are not yet compressed, essentially because lateral movements of compressed fibers are naturally difficult. The pre-compacting device with independent rows of fingers allow the compensate for a lateral inhomogeneous feed of the agricultural fibrous matter.

It is also envisioned that the packing device with rows of corrugated disks inserted into slits of the walls of the hopper, downstream of the pre-compacting device, is useful in that it allows moving the pre-compacted agricultural fibrous matter which due to the pre-compaction is rendered difficult to move towards the extruder. The use of a series of corrugated disks arranged in rows, protruding inwardly into the hopper is efficient for moving and packing the agricultural fibrous matter.

DRAWINGS

Figure 10:
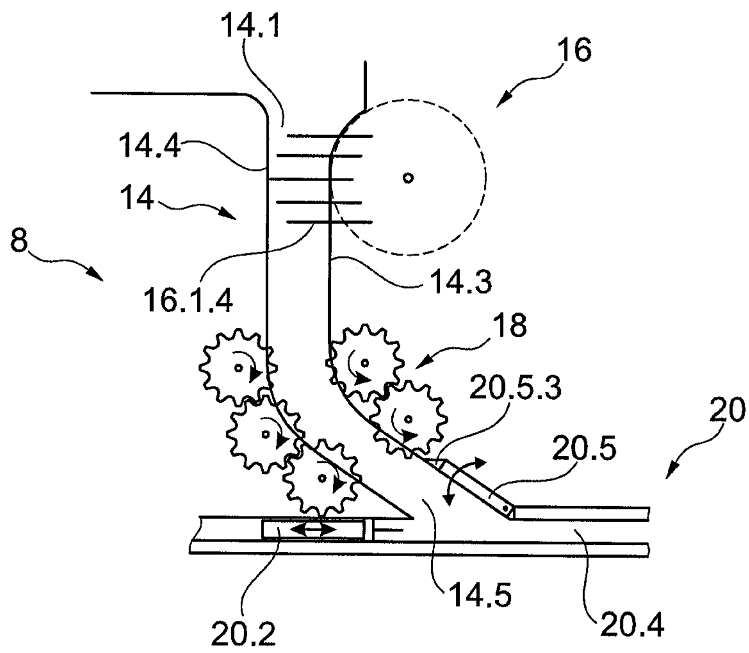
FIG. 10 is a schematic section view of the machine for compacting, by extrusion, agricultural fibrous matter into the fiberboards in a feeding position, in accordance with various embodiments of the invention.
Figure 11:
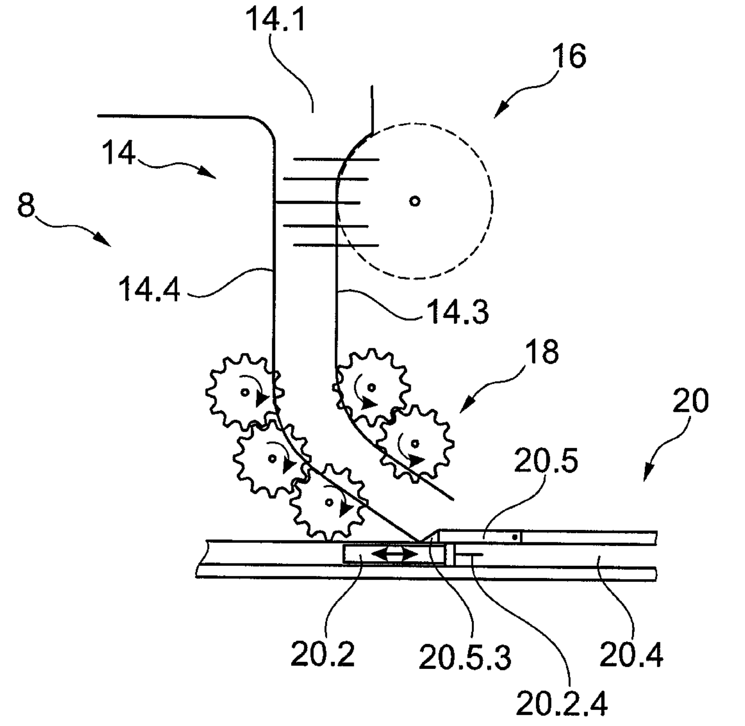

FIG. 11 corresponding to FIG. 10 in an extrusion position, in accordance with various embodiments of the invention.

DETAILED DESCRIPTION

Figure 1:
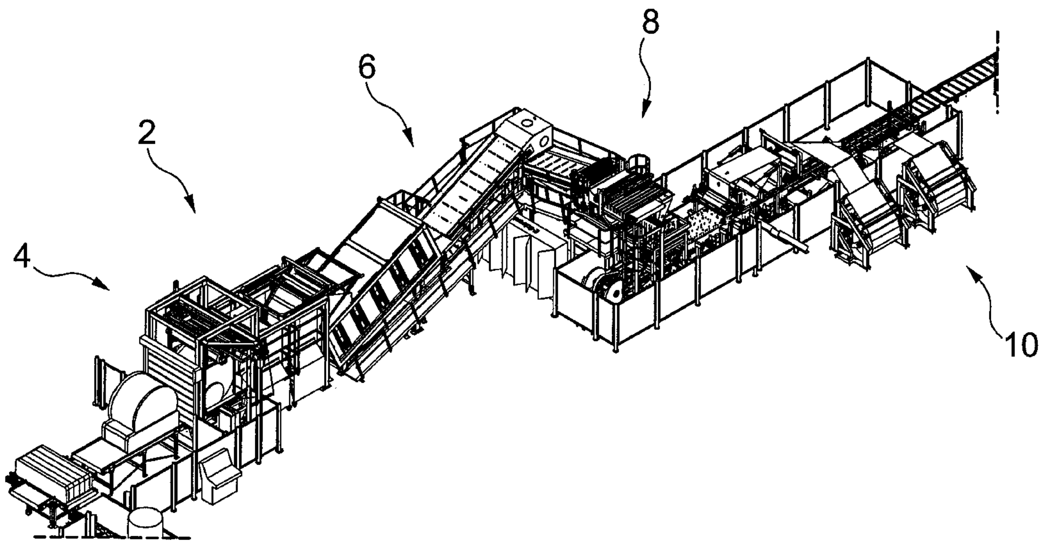
FIG. 1 is a perspective view of a production line for manufacturing fiberboards, comprising a machine for compacting, by extrusion, agricultural fibrous matter into the fiberboards, according to various embodiments of the invention.

FIG. 1 illustrates, in perspective, a production line for manufacturing fiberboards made of agricultural fibrous matter.

The agricultural fibrous matter can be straw, hay or any other known fibers originating from fibrous plants like cereals, or any combination thereof. The fiberboards comprise a core made of the agricultural fibrous matter in a compressed state and two films on the two opposed main faces of the fiberboards. The films can be paper or any other suitable material like plastic-based films.

The production line 2 comprises, essentially, a deballing device 4 that receives bales of the agricultural fibrous matter on a conveyor belt, a conveying device 6 that conveys the loose agricultural fibrous matter coming out of the deballing device 4 to a machine 8 for compacting the agricultural fibrous matter into the board. As this is visible that fiberboard production machine 8 is equipped with two reels 10 of the top and lower films to be applied to the compacted fibrous core of the board.

The deballing device 4, the conveying device 6 and some parts of the machine 8 that compact the agricultural fibrous matter into the board are known as such from the skilled person and do not need to be further detailed.

The present invention is directed to some parts of the fiberboard production machine 8, that will be detailed in connection with the remaining Figures.

Figure 2:
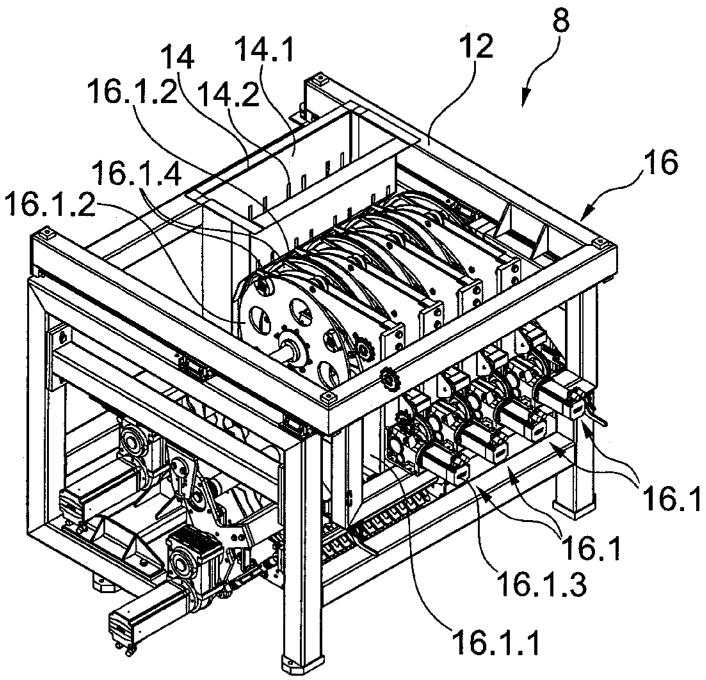
FIG. 2 is a perspective view of a pre-compacting device of the machine for compacting, by extrusion, agricultural fibrous matter into the fiberboards according to various embodiments of the invention.

FIG. 2 is a perspective view of an upper portion of the fiberboard production machine 8 comprising a frame 12, a hopper 14 attached to the frame 12 and a pre-compacting device 16 attached also to the frame 12 and cooperating with the hopper 14 for pre-compacting the agricultural fibrous matter entering the hopper 14 from the top thereof. As this is apparent, the pre-compacting device 16 comprises several sub-units 16.1 arranged side-by-side along a transversal axis and operating independently. Each sub-unit 16.1 comprises a frame 16.1.1 that is generally planar, and two support rotating disks 16.1.2 arranged on each main side of the frame 16.1.1. Each sub-unit 16.1 further comprises a gear motor 16.1.3 that drives via a sprocket chain the two support rotating disks 16.1.2. Each of the two support rotating disks 16.1.2 carries fingers 16.1.4 that are pivotally mounted at the periphery of the support rotating disk. A crank mechanism is provided for each finger 16.1.4 such that the fingers keep the same absolute orientation while the support rotating disks 16.1.2 are rotating. That orientation is generally horizontal. The crank mechanism will be detailed below in connection with FIGS. 3 and 4.

Still with reference to FIG. 2, the hopper 14 shows a generally rectangular cross-section, being however understood that other shapes are conceivable. It also has an opening 14.1 at an upper end, for receiving the loose and uncompacted agricultural fibrous matter from the deballing device 4 via the conveying device 6 as illustrated in FIG. 1. The hopper 14 shows two main opposed and for instance parallel walls provided with vertical slits 14.2 positioned and dimensioned for receiving the fingers 16.1.4 of the pre-compacting device 16. More specifically, the slits of each wall are arranged in pair for each sub-unit 16.1, where the corresponding pairs of slits on the two opposed wall are aligned along a transversal direction that corresponds to the direction of the fingers 16.1.4, so as to allow each finger 16.1.4 to successively penetrate the corresponding slit in the adjacent wall, slide along the slit, penetrate the corresponding slit in the opposed wall, slide along the slit, move out of that slit and move out of the slit in the adjacent wall. This movement of each of the fingers 16.1.4 displaces downwardly and pre-compacts the agricultural fibrous matter falling into the hopper 14 from the top through its opening 14.1.

Each sub-unit 16.1 of the pre-compacting device 16 can be controlled independently in speed, e.g., by controlling each gear motor 16.1.3, in order to compensate any inhomogeneity of the agricultural fibrous matter downstream in the hopper.

Figure 3:
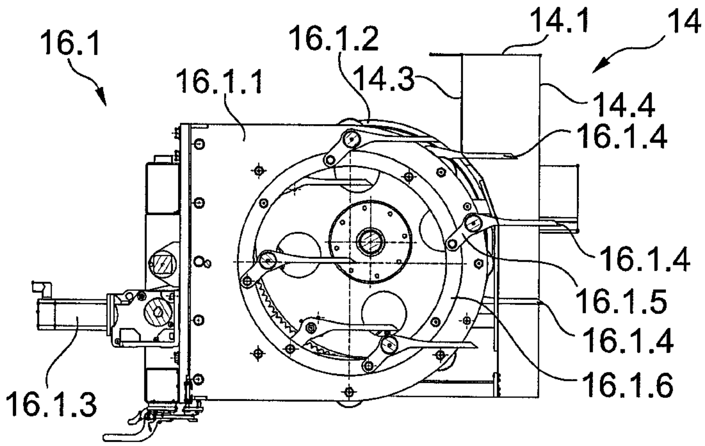
FIG. 3 is a sectional view of the pre-compacting device of FIG. 2, in accordance with various embodiments of the invention.

FIG. 3 is a sectional view of a sub-unit 16.1 of the pre-compacting device 16 of FIG. 2, along a longitudinal plane passing between the frame 16.1.1 and one of the support rotating disks 16.1.2, and oriented towards the frame 16.1.1. As illustrated, four fingers 16.1.4 are carried by the support rotating disk that is backwards relative to the cut plane and therefore not visible. These four fingers 16.1.4 are for instance distributed homogeneously around the periphery, i.e., at 90° from each other successively. We can see that each of these four fingers 16.1.4 is pivotally mounted on the not visible support rotating disk and comprises a crank 16.1.5 rigidly fixed to the finger and with a roller or guide engaging in a circular track 16.1.6 that is off-centered relative to the support rotating disk. The circular track 16.1.6 is fixed with the frame 16.1.1. When the support rotating disk carrying the fingers 16.1.4 is rotating, the off-centered circular track 16.1.6 caused each of the fingers 16.1.4 to keep the same orientation which is for instance generally horizontal.

Figure 4:
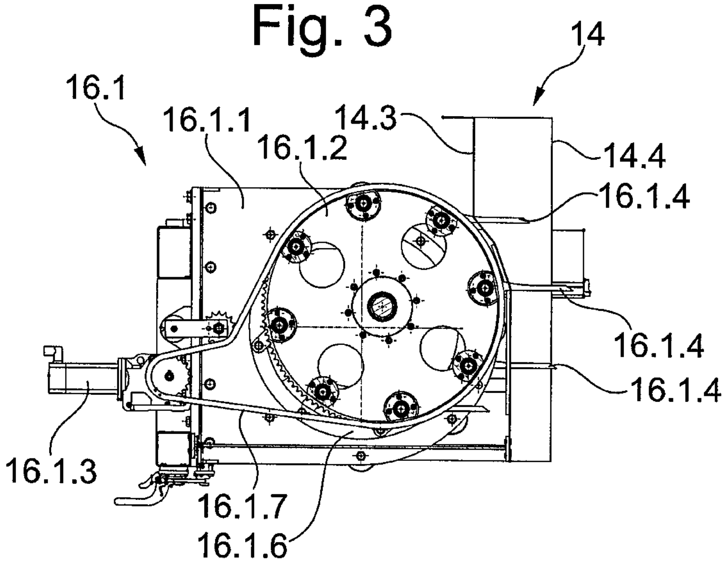
FIG. 4 is another sectional view of the pre-compacting device of FIG. 3, in accordance with various embodiments of the invention.

Still with reference to the FIG. 4, we can observe, through the circular opening in the frame 16.1.1, within the circular track 16.1.6, the left support rotating disk 16.1.2 carrying also four fingers 16.1.4 only partially visible and distributed homogeneously along the periphery of the support rotating disk 16.1.2, i.e. at 90° from each other successively. We can also observe that the four fingers 16.1.4 carried by the left support rotating disk 16.1.2 are angularly off-set relative to the four fingers 16.1.4 carried by the non-visible right support rotating disk, for instance by 45°. This angular off-set is interesting in that it allows the cranks of the fingers of each of the left and right support rotating disks 16.1.2 to engage with the same circular track 16.1.6 without interfering each other. This arrangement is also advantageous with regard to the pre-compaction of the agricultural fibrous matter in that the fingers 16.1.4 contacting the agricultural fibrous matter in the hopper are more homogenously distributed in a vertical direction. This improves the displacement control of the agricultural fibrous matter and therefore the compaction homogeneity.

FIG. 4 is a side view of the sub-unit 16.1 of FIG. 3, i.e., of the pre-compacting device 16 of FIG. 2, from the right side. We can see the right support disk 16.1.2 that is driven by the gear motor 16.1.3 via a sprocket chain 16.1.7 engaging with sprocket teeth provided at the periphery of the right support disk 16.1.2. That right support disk 16.1.2 is mechanically linked to the left support disk (not visible) via a flange attached to the disk, centered with the rotating axis thereof, a corresponding spacer (not visible) and a counter-flange (visible in FIG. 3) attached to the left support rotating disk. Both left and right support disks 16.1.2 are therefore driven at unison by the gear motor 16.1.3.

With reference to both FIGS. 3 and 4, we can observe the longitudinal profile of the hopper 14. The latter comprises an adjacent wall 14.3 and an opposed wall 14.4, both provided with the vertical slits for the fingers 16.1.4. The adjacent wall 14.3 is curved so as to mate with the circular periphery of the support rotating disks 16.1.2 whereas the opposed wall 14.4 remains generally straight. The curved profile of the adjacent wall 14.3 causes the transversal cross-section of the hopper 14 to diminish while the agricultural fibrous matter moves downwardly by the action of the pre-compacting device 16, causing a pre-compaction of the agricultural fibrous matter. The above cross-section reduction is of at least 30%.

In relation with the above description of FIGS. 3 and 4, it is to be understood that the number of fingers per sub-unit of the pre-compacting device and the number of fingers per support rotating disk can be different, i.e., higher or lower. Also, the number of sub-units can also be different, higher or lower.

Figure 5:
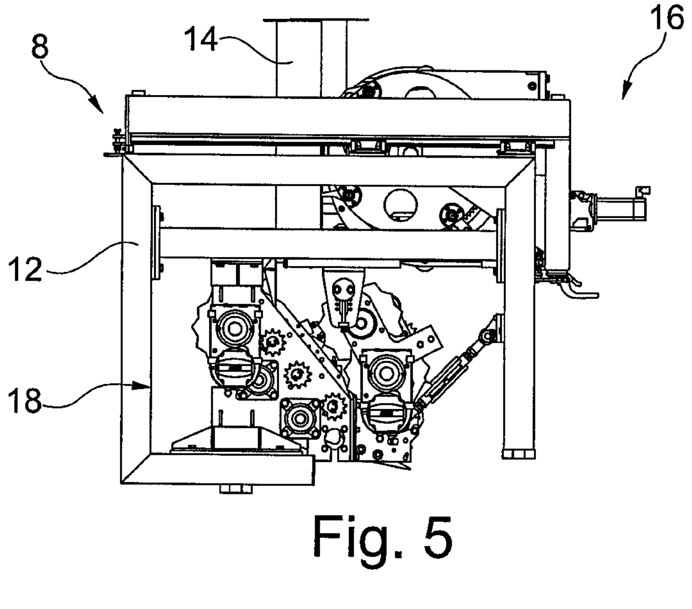
FIG. 5 is a side view of the machine for compacting by extrusion agricultural fibrous matter into the fiberboards, according to the invention, showing the pre-compacting device of FIGS. 2 to 4 and a packing device, in accordance with various embodiments of the invention.

FIG. 5 is a side view of the fiberboards production machine 8, illustrating the frame 12, the hopper 14, the pre-compacting device 16 as detailed above, and a packing device 18. The latter is located below and downstream of the pre-compacting device 16 and packs the pre-compacted agricultural fibrous matter towards an extruder that will be described below in connection with FIGS. 7-9.

Figure 6:
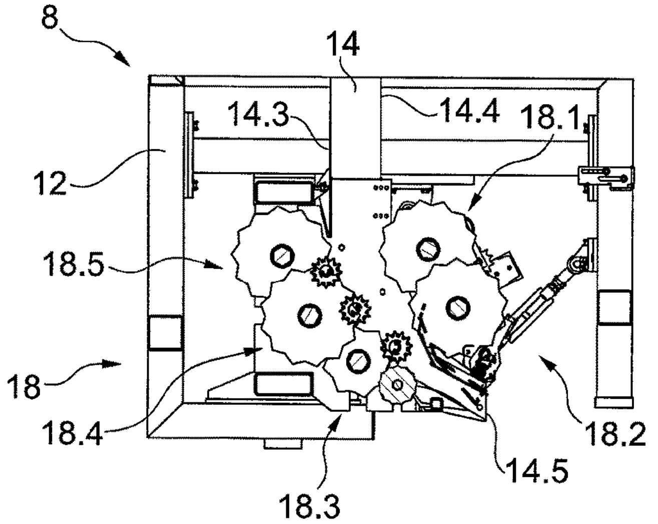
FIG. 6 is a sectional view of the packing device of FIG. 5, in accordance with various embodiments of the invention.

FIG. 6 is a longitudinal sectional view of the lower part of the fiberboards producing machine 8 of FIG. 5, detailing the packing device 18 and the corresponding lower part of the hopper 14.

The packing device 18 comprises several rows of corrugated disks 18.1, 18.2, 18.3, 18.4, 18.5, for instance five thereof. It is however to be understood that this number can be different, for instance higher or lower. At least one row of corrugated disks is provided on each main side of the hopper 14, i.e., on the adjacent wall 14.3 and on the opposed wall 14.4. Each of these adjacent and opposed walls 14.3 and 14.4 comprises vertical slits into which the corrugated disks are inserted and protrude into the interior of the hopper 14. Each row of corrugated disks comprises an axle onto which the corrugated disks are rotatably engaged. Each axle is driven by a gear motor so as to rotate the corresponding corrugated disks at unison. Each row of corrugated disks comprises at least 10 of the corrugated disks.

As this is apparent in FIG. 6, the passage for the agricultural fibrous matter in the hopper 14 forms a bend and shows a width that progressively reduces along the bend. This means that the agricultural fibrous matter, after being fed to the hopper 14 via its opening and after being pre-compacted by the fingers of the pre-compacting device, is progressively moved and packed by the rotating corrugated disks of the packing device 18, towards an exit 14.5 of the hopper 14 opening out to the extruder that will be described here below.

Figure 7:
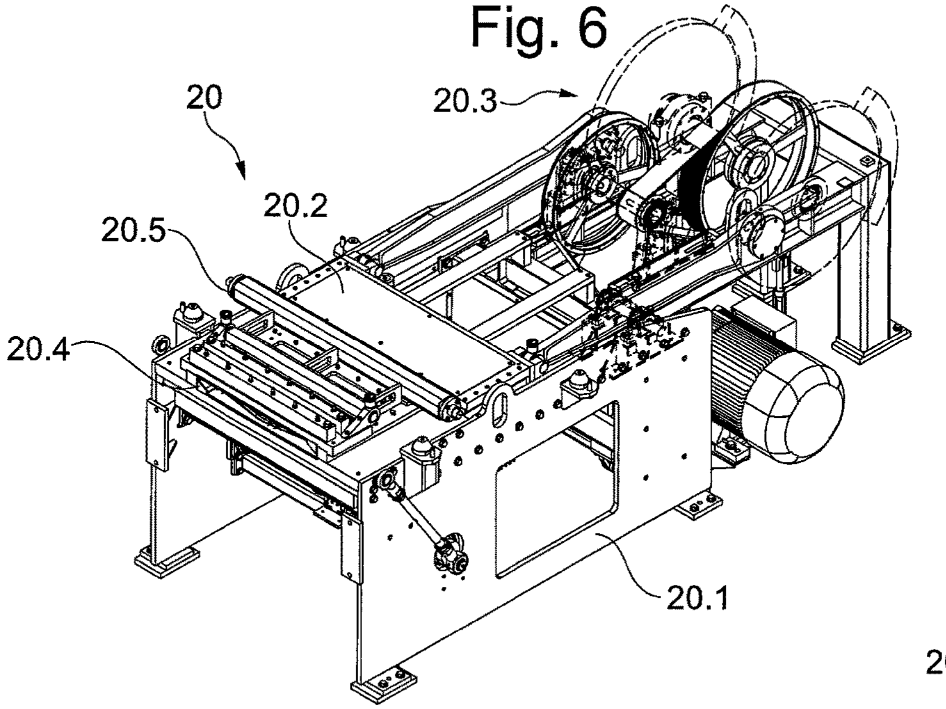
FIG. 7 is a perspective view of an extruder of the machine for compacting, by extrusion, agricultural fibrous matter into the fiberboards, in accordance with various embodiments of the invention.

FIG. 7 is a perspective view of the extruder 20 of the fiberboards producing machine 8, positioned at a lower portion of the fiberboards producing machine 8.

The extruder 20 comprises a frame 20.1 which is for instance configured for resting on the floor, a ram 20.2 and a drive unit 20.3 that is configured for moving the ram 20.2 horizontally in a reciprocal fashion. The drive unit 20.3 is as such known to the skilled person and does not need to be further detailed. The ram 20.2 is generally flat and even planar, and guided along a translation direction by the frame 20.1. The translation direction is for instance horizontal and corresponds to the longitudinal direction of the extruder 20. An extrusion passage 20.4 is formed on the frame 20.1 and into which the ram 20.2 can move for extruding the agricultural fibrous matter and form the fiberboard. The extrusion passage 20.4 is generally horizontal and extends transversally, corresponding to the cross-section of the fiberboard to be produced. The main opposed and horizontal sides are straight and parallel whereas the lateral sides can be inclined as this will be apparent here after.

The extrusion passage 20.4 comprises a movable wall 20.5 configured for pivoting between a feed position, opening the extrusion passage to the hopper, and an extrusion position, as in FIG. 7, closing the extrusion passage to the hopper. This function will be detailed here after in relation with FIGS. 8 to 11.

Figure 8:
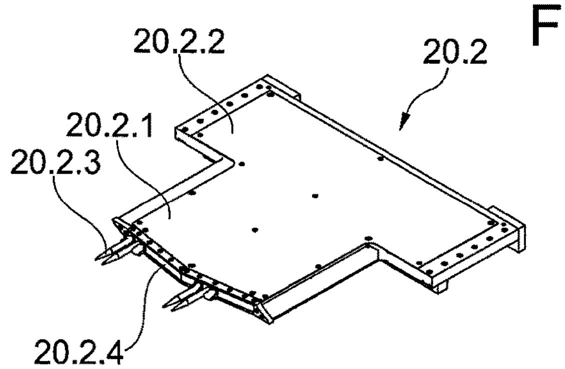
FIG. 8 is a perspective view of the ram of the extruder of FIG. 7, in accordance with various embodiments of the invention.

FIG. 8 is a perspective view of the ram 20.2. As this is apparent, the ram 20.2 is generally flat and planar with a thickness that corresponds essentially to the thickness of the fiberboard to be produced. The ram 20.2 comprises a front portion 20.2.1 configured for engaging in the extrusion passage 20.4 (FIG. 7) and a rear portion 20.2.2 that is larger and mechanically attached to the drive unit 20.3 (FIG. 7) via two rods. As this is apparent the front portion 20.2.1 shows inclined side walls configured for mating with corresponding inclined side walls of the extrusion passage 20.4 (FIG. 7). The two opposed side walls can be inclined in an inverted manner so as to produce a fiberboard with corresponding inverted side walls that facilitate the junction between adjacent fiberboards during their assembly. It is to be noted that the side walls do not need to be straight, i.e., they can have specifically mutually mating and/or engaging designed profiles for providing a stronger and/or deeper mutual engagement when being assembled to each other.

Still with reference to FIG. 8, the ram 20.2 can comprise at the front face of the front portion 20.2.1 one or several pointed cylinders 20.2.3 for forming one or several channels in the fiberboard, e.g., for passing electric cables. Further the front face can be equipped, at an upper edge thereof, with a cutting blade 20.2.4 for cooperating with a corresponding cutting blade on the movable wall 20.5 (FIG. 7).

Figure 9:
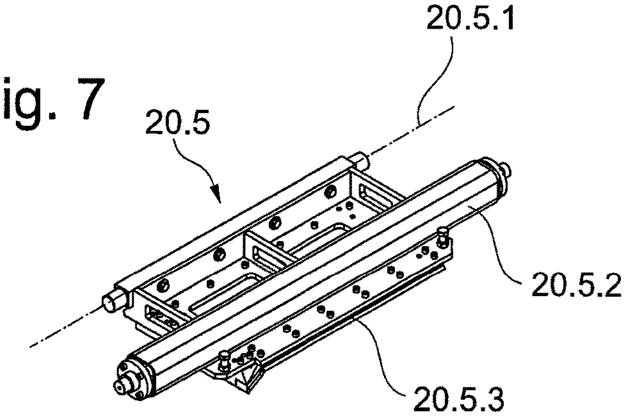
FIG. 9 is a perspective view of the movable wall of the extruder of FIG. 7, in accordance with various embodiments of the invention.

FIG. 9 is a perspective view of the movable wall 20.5 of the extrusion passage 20.4 (FIG. 7). The movable wall 20.5 comprises at a rear or downstream edge thereof a pivoting axis 20.5.1 that is formed for instance by two laterally protruding trunnions, being however understood that alternative constructions of the pivoting axis can be considered. The movable wall 20.5 comprises also at a front or upstream portion thereof a transversal actuation bar configured for being engaged at its two opposed ends with an actuation mechanism for pivoting the movable 20.5 between the feed position and the extrusion position. The movable wall 20.5 further comprises at a front or upstream edge thereof a cutting blade 20.5.3 configured for cooperating with the corresponding cutting blade 20.2.4 of the ram 20.2 (FIG. 8).

FIGS. 10 and 11 are schematic sectional views of the machine for compacting by extrusion agricultural fibrous matter into the fiberboards according to the invention, where the movable wall is in the feeding position (FIG. 10) and in the extrusion position.

With reference to FIG. 10, the agricultural fibrous matter is fed at the opening 14.1 of the hopper 14 and successively pre-compacted by the fingers 16.1.4 of the pre-compacting device 16, packed by the rotating corrugated disks of the packing device 18 and then fed to the extruder 20, in particular to the extrusion passage 20.4 while the movable wall 20.5 thereof is in the feed position. In that position, the movable wall 20.5 is pivoted to open the extrusion passage 20.4 to the exit 14.5 of the hopper. In that position, the movable wall 20.5 is in alignment with the adjacent wall 14.3 of the hopper 14 in order to properly guide the agricultural fibrous matter to the extrusion passage 20.4. In that operational mode of the fiberboard producing machine 8, the ram 20.2 is in a retracted position, i.e. retracted from the extrusion passage 20.4.

With reference to FIG. 11, only the extrusion passage 20.4 is sufficiently fed with the agricultural fibrous matter, the movable wall 20.5 is moved, for instance pivoted, to the extrusion position, i.e. a position that closes the connection or passage between the extrusion passage 20.4 and the exit 14.5 of the hopper 14. In that position, the movable wall 20.5 is in alignment with the adjacent fixed wall of the extrusion passage 20.4. The ram 20.2 is then moved towards the extrusion passage 20.4 causing a displacement and compression of the agricultural fibrous matter into the extrusion passage 20.4. Also, the cutting blade 20.2.4 of the ram 20.2 approaches the cutting blade 20.5.3 of the movable wall 20.5 so as to form a shear-cutting of the agricultural fibrous matter that remains between the cutting blade 20.5.3 of the movable wall 20.5 and the adjacent wall of the extrusion passage 20.4. Also, the presence of the movable wall 20.5, for instance in the extrusion position, allows the ram 20.2 to compress the agricultural fibrous matter at an earlier stage of the ram stroke compared with conventional extruders. The agricultural fibrous matter is therefore not only better pre-compacted and packed in the hopper but also better compacted in the extruder.

The fiberboard that is produced by the above-described machine can have a strength of 70 mm, for example with two double cable channels. The density of the board can be of about 340 kg/m$^3$.

What is claimed is:

1. A machine for compacting agricultural fibrous matter into a board, said machine comprising:

a hopper for receiving the agricultural fibrous matter; and an extruder, the extruder comprising:

an extrusion passage downstream of the hopper; and a ram configured for moving in a reciprocal manner along the extrusion passage, wherein the extrusion passage comprises a movable wall configured for moving between a feed position, in alignment with an adjacent wall of the hopper and opening the extrusion passage to the hopper, and an extrusion position, closing a passage between the extrusion passage and the hopper; and wherein the movable wall comprises a downstream edge with a pivoting axis and an upstream edge provided with a cutting blade configured for cooperating with a corresponding front edge of the ram in the extrusion position of the movable wall, said upstream edge being a free end of the movable wall.

2. The machine according to claim 1, wherein the corresponding front edge of the ram is provided with a cutting blade configured for cooperating with the cutting blade of the movable wall so as to cut the agricultural fibrous matter adjacent the upstream edge of the movable wall.

3. The machine according to claim 1, wherein the front edge of the ram has an arrow-shaped longitudinal profile and the upstream edge of the movable wall has a straight longitudinal profile.

4. The machine according to claim 1, wherein the movable wall is pivotally mounted on the extruder, at the downstream edge of the movable wall.

5. The machine according to claim 1, wherein the movable wall in the feed position connects with the adjacent wall of the hopper.

6. The machine according to claim 1, further comprising:

a pre-compacting device comprising several rows of fingers configured for moving successively into, along and out of vertical slits formed in at least a wall of the hopper, each row being independent in speed.

7. The machine according to claim 6, wherein the pre-compacting device comprises at least one support rotating disk for each row of fingers and carrying the fingers of the corresponding row of fingers.

8. The machine according to claim 7, wherein the pre-compacting device further comprises, for each row of fingers, a circular track eccentric with the at least one support rotating disk, each finger being rotatably mounted on the corresponding support disk and with a crank engaging in the corresponding circular track so that the finger remains parallel to a direction while the support rotating disk is rotating.

9. The machine according to claim 6, wherein the pre-compacting device comprises at least three rows of fingers of the several rows of fingers.

10. The machine according to claim 1, further comprising a packing device comprising at least one row of rotating corrugated disks inserted through vertical slits formed in a wall of the hopper.

11. The machine according to claim 10, wherein the at least one row of rotating corrugated disks comprises at least one of the row of rotating corrugated disks on each of two opposed main sides of the hopper.

12. The machine according to claim 10, wherein each of the at least one row of rotating corrugated disks comprises at least ten of the rotating corrugated disks.

13. The machine according to claim 10, wherein each of the at least one row of rotating corrugated disks comprises a shaft rotatably supporting the rotating corrugated disks of the row.

14. The machine according to claim 10, wherein the hopper has a rectangular cross-section profile with a width that progressively reduces along the packing device towards to the extruder.

15. The machine according to claim 10, wherein the hopper has bent longitudinal profile between the packing device and the extruder.

16. The machine according to claim 10, further comprising:

a pre-compacting device comprising several rows of fingers configured for moving successively into, along and out of vertical slits formed in at least a wall of the hopper, each row being independent in speed; and wherein the pre-compacting device is upstream of the packing device.

* * * * *